United States Patent [19]

Gitlin et al.

[11] Patent Number: 4,924,492

[45] Date of Patent: May 8, 1990

[54] METHOD AND APPARATUS FOR WIDEBAND TRANSMISSION OF DIGITAL SIGNALS BETWEEN, FOR EXAMPLE, A TELEPHONE CENTRAL OFFICE AND CUSTOMER PREMISES

[75] Inventors: Richard D. Gitlin, Monmouth County; Sailesh K. Rao, Ocean County; Jean-Jacques Werner; Nicholas Zervos, both of Monmouth County, all of N.J.

[73] Assignees: American Telephone and Telegraph Company, New York, N.Y.; AT&T Information Systems, Inc., Morristown, N.J.

[21] Appl. No.: 171,636

[22] Filed: Mar. 22, 1988

[51] Int. Cl.$^5$ ............................................. H04M 11/00
[52] U.S. Cl. ...................................... 379/93; 379/98; 370/24; 370/32.1; 370/76; 370/119; 371/43
[58] Field of Search .......................... 379/93, 98, 97, 94; 370/43, 119, 110.1, 32.1, 24, 29, 30, 69.1, 76; 375/13, 39, 8; 371/43

[56] References Cited

U.S. PATENT DOCUMENTS

| | | |
|---|---|---|
| 4,117,277 | 9/1978 | van den Elzen et al. ........... 379/406 |
| 4,660,214 | 4/1987 | Pahlavan et al. ...................... 375/39 |
| 4,677,625 | 6/1987 | Betts et al. ............................. 375/39 |
| 4,682,358 | 7/1987 | Werner ................................. 370/32.1 |

FOREIGN PATENT DOCUMENTS

| | | | |
|---|---|---|---|
| 8705173 | 8/1987 | PCT Int'l Appl. ............... 370/110.1 |
| 2120908 | 12/1983 | United Kingdom ................... 375/39 |
| 2166025 | 4/1986 | United Kingdom ............. 370/110.1 |
| 2188518 | 9/1987 | United Kingdom ................... 375/39 |

OTHER PUBLICATIONS

P. J. van Gerwen et al., "Wideband Data Transmission Techniques", Philips Research Laboratories, Netherlands, pp. 37, 38, 40, 70, Jun. 1970 *Telecommunications.*
P. di Tna et al., "Design and Simulation . . . 80 Kbit/s . . . Subscriber Loop", CSELT Technical Report, vol. IX, Supp. No. 4, Aug. 1981, pp. 361-367.
O. Agazzi et al., "Data Communication Ic's", Feb. 11, 1982, IEEE International Solid-State Circuits Conference, pp. 144, 145, 310.
H. K. Thapar, "Real-Time Application of Trellis Coding To High Speed Voiceband Data Transmission", IEEE Journal on Selected Areas in Communications, vol. SAC.-2, No. 5, Sep. 1984, pp. 648-658, (Class 375-39).
D. G. Messerschmitt, "Design Issues in the ISDN U-Interface Transceiver", *IEEE Journal on Selected Areas in Communications,* vol. SAC-4, No. 8, Nov. 1986, pp. 1281-1293.
S. Kasturia et al., "Spectrally Constrained Codes for High Rate ISDN Subscriber Loop", *IEEE International Conference on Communications '88: Digital Technology*—Spanning the Universe, Jun. 12-15, 1988, Conference Record, vol. 1, pp. 96-100, 1988.
C. Hoppitt, "ISDN Evolution: From Copper to Fiber in Easy Stages", *IEEE Communications Magazine,* vol. 24, No. 11, Nov. 1986, pp. 17-22.

*Primary Examiner*—Jin F. Ng
*Assistant Examiner*—Wing F. Chan
*Attorney, Agent, or Firm*—Ronald D. Slusky

[57] ABSTRACT

In a telephone local loop transmission arrangement, data is communicated from the customer premises to the central office utilizing a multi-dimensional, passband signal illustratively at 480 kb/s and 1.544 Mb/s.

28 Claims, 7 Drawing Sheets

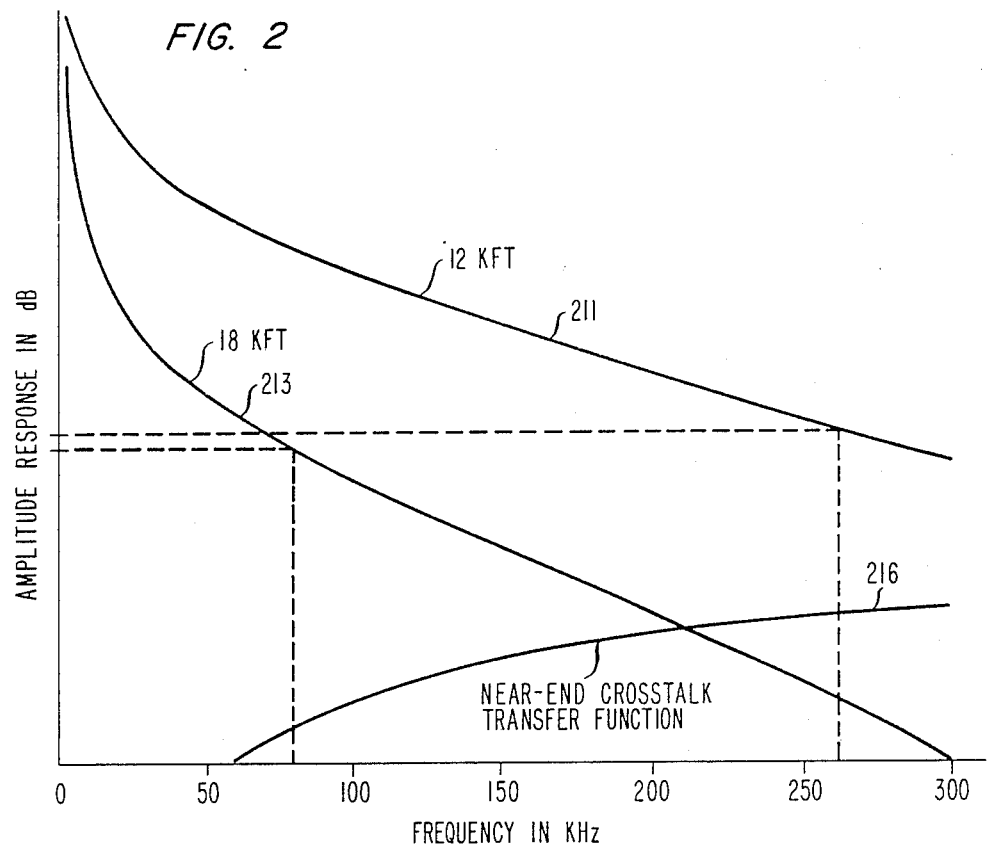
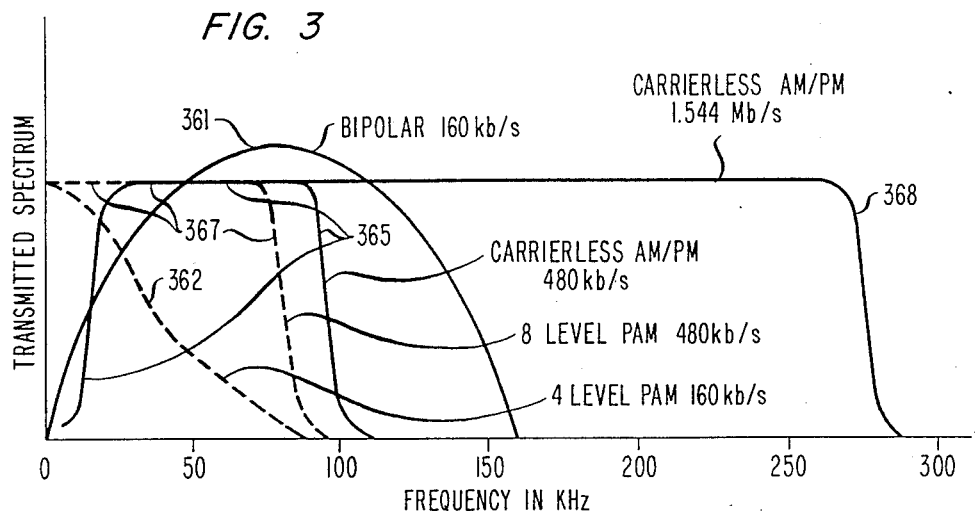

FIG. 4
FIG. 5
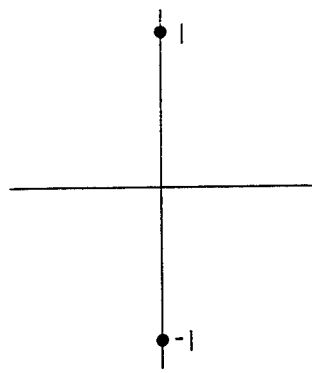
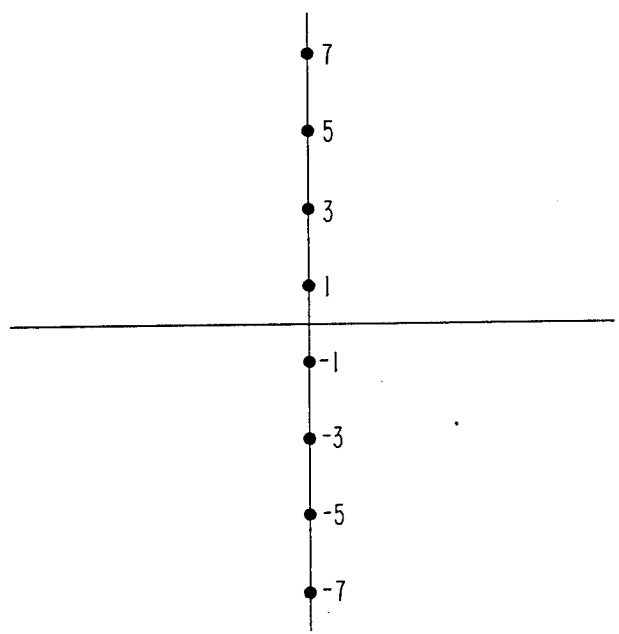
FIG. 6

| Y2, Y1, Y0 | SUBSET |
|---|---|
| 0 0 0 | a |
| 0 0 1 | e |
| 0 1 0 | c |
| 0 1 1 | g |
| 1 0 0 | b |
| 1 0 1 | f |
| 1 1 0 | d |
| 1 1 1 | h |

METHOD AND APPARATUS FOR WIDEBAND TRANSMISSION OF DIGITAL SIGNALS BETWEEN, FOR EXAMPLE, A TELEPHONE CENTRAL OFFICE AND CUSTOMER PREMISES

BACKGROUND OF THE INVENTION

The present invention relates generally to telephone transmission and, more particularly, to the transmission of high-speed digital signals between a telephone central office and the customer premises.

Perhaps the most flexible and least expensive approach for transmitting data over telephone lines is to use the existing voiceband telephone channels normally used to carry speech. The channel between the transmission endpoints may be either a switched network connection—established by the user at one endpoint by simply dialing the telephone number of the other endpoint—or it may be a permanent, private line connection which is set up for the user by the telephone company. In either case, once the connection has been established, data from the user's data communication/processing equipment is input to a voiceband modem which generates an output analog line signal having a frequency spectrum which matches the passband of the voiceband telephone channel. At the receiving end, a matching modem recovers the data from the received line signal and passes it to user's equipment at that end.

For a given level of noise and distortion, the rate at which data can be communicated over a channel is limited by its bandwidth. The bandwidth of the typical voiceband telephone channel is about 4 kHz. For typical levels of noise and distortion, this limits the transmission rate over such channels to a theoretical maximum of about 23 kb/s (kilobits per second). For many applications—such as database input/retrieval or other applications typically involving a human being at at least one end of the transaction—data rates well below this theoretical maximum are wholly satisfactory. Indeed, a vast number of modems operating at bit rates ranging from 1.2 to 19.2 kb/s are in current use in a wide range of applications.

For many other applications, however, such as computer-to-computer file transfers, videotext, transmission of digitized speech or video, etc., voiceband telephone data transmission is unacceptably slow. Advantageously, most of the transmission facilities interconnecting telephone switching offices around the country communicate their information in the form of multiplexed, high-speed digital bit streams. These facilities can be configured to provide not only the standard 4 kHz voiceband channels, but also wideband channels capable of carrying customer data at, for example, the so-called DS-1 rate of 1.544 Mb/s (megabits per second) or even higher.

The challenge, however, is to get the customer's high-speed data to the central office from the customer premises. In the future, it is anticipated that this need will be met by optical fiber ubiquitously linking the customer premises with the central office. It will be well into the twenty-first century, however, before this promise becomes a reality. At present, then, and for the immediate future, the existing telephone local distribution system—comprised of copper wire pairs—is and will continue to be the mechanism for delivering high-speed data to the central office.

Indeed, telephone engineers have been successful in providing transmission schemes that allow for high-speed data transmission from the customer premises to the central office. In the mid-1970's, for example, AT&T introduced a digital data communications network—the Digital Data System (DDS)—in which data at rates of up to 56 kb/s was transmitted from the customer premises to the central office using a four-wire local circuit, i.e., two two-wire pairs. The essence of the transmission scheme was to use bipolar baseband transmission in combination with, inter alia, fixed equalization to compensate for linear distortion and thereby provide a channel with flat loss up to frequencies sufficient to transmit at the required bit rate. This scheme allowed for unrepeatered transmission of almost eight miles at the 56 kb/s rate (and even greater distances at lower rates), thereby truly providing high-speed customer-premises-to-central-office transmission over the "local loop" for a significant base of customers. (See, for example, E. C. Bender et al, "Digital Data System: Local Distribution System," *The Bell System Technical Journal*, Vol. 54, No. 5, May-Jun. 1975.)

Subsequently, a 1.544 Mb/s speed was added to DDS, and data transmission at that rate was thereafter provided in other digital data transmission offerings. This transmission rate was achieved by using the technology developed for the so-called T1 carrier system—which had to that point been principally used to interconnect telephone central offices. Here again, the transmission scheme involved a four-wire circuit and a bipolar transmission format. Indeed, the design of DDS was based on the previously existing T1 technology. At the 1.544 Mb/s rate, however, compensation for channel distortion and noise required equalization and regeneration of the line signal at no more than every 6000 ft (6 kft).

The above approaches are certainly technically sound and are used quite extensively. They are in various ways, however, not up to the demands of the 1990's. For example, the keystone of telecommunications in the coming decade will be the Integrated Services Digital Network (ISDN)—a telecommunications facility that will provide, using (a) a unified addressing and signaling scheme and (b) a single physical point of access, the capabilities that are now provided by a host of separate networks, such as voice, circuit-data, packet-data, telex, private-line networks, etc. Central to the implementation of ISDN is the notion of completing the digitalization of the telephone network by providing the customer with duplex, i.e., simultaneous two-directional, digital transmission capability to the central office over a single two-wire pair at a distance of up to 18 kft at speeds ranging from the so-called ISDN "basic" (2B+D) rate (with framing, maintenance and control bits) of 160 kb/s up to the so-called "primary" (23B+D) rate (again with framing, maintenance and control bits) of 1.544 Mb/s and even beyond.

Disadvantageously, transmission based on T1 technology, although usable in this application, is relatively expensive to provision and maintain. This is principally due to the requirement for closely spaced regenerators and, secondarily, to the requirement of a separate two-wire line for each direction of transmission. Success of ISDN, by contrast, demanded a low-cost solution, at least for transmission at the 160 kb/s "basic" rate. A DDS type of transmission scheme, by contrast, could be used in ISDN applications, but is not feasible for data rates much in excess of the ISDN basic rate.

Ultimately, telephone engineers chose the solution described, for example, in document T1D1.3/86-145R1 dated Oct. 13, 1986 prepared by the CCITT Ad Hoc Group on Draft Standard and entitled "Draft Standard for ISDN Basic Access Interface for Application at the Network Side of NT1, Layer 1 Specification." Basically, this approach uses a four-level pulse amplitude modulation (PAM) transmission scheme, referred to as 2B1Q (because it maps two bits into one quaternary symbol) in combination with (a) adaptive equalization, which is a much more powerful technique for compensating for linear distortion in the channel than the fixed equalization previously used and (b) echo cancellation, which permits duplex transmission over a single wire pair. This approach, although providing two-wire data transmission over the local loop at the basic rate, pushes the state of the art for transmission of high-speed data from the customer premises to the central office. Where data rates significantly in excess of 160 kb/s over an 18 kft loop are needed, it has to this point been envisioned that T1 technology will have to be continued to be used.

SUMMARY OF THE INVENTION

Central to the known schemes for transmitting high-speed data over the local loop has been the use of baseband transmission schemes, such as the bipolar scheme used in DDS and T1 and the four-level 2B1Q scheme proposed for ISDN. In accordance with the present invention, we have realized that passband transmission of the type that has been used for many years in, for example, voiceband data transmission and digital radio systems can be employed in an environment—local loop transmission—where the age-old standard has been baseband signaling, in order to provide for data transmission speeds significantly greater than that provided by current technology at a commercially acceptable level of performance.

The dramatic increase in data transmission speed afforded by the invention arises from a number of considerations. For example, a passband signal can be positioned at any desired location in the frequency spectrum. Advantageously, then, it can be so positioned within the frequency spectrum as to optimize the amount of added noise, taking into account both low frequency noise such as impulse noise and voice crosstalk, and high frequency noise, such as near-end crosstalk (which arises from other signals of like spectrum in neighboring loops within the same cable). In addition, a passband signal has no significant energy at or near dc. We have recognized that this characteristic avoids several echo canceller design problems that occur when baseband transmission is used and which are exacerbated as the symbol rate increases. It also avoids a problem with so-called "dc wander," which is exacerbated in a baseband transmission scheme as the number of bits per symbol is increased.

In accordance with a feature of the invention, the passband signal is a so-called carrierless amplitude modulation/phase modulation signal.

In accordance with another feature of the invention, a trellis code or other code that provides coding gain can be used in conjunction with maximum likelihood sequence estimation, also referred to as Viterbi decoding, at the receiver to provide enhanced receiver noise immunity.

BRIEF DESCRIPTION OF THE DRAWING

In the drawing,

FIGS. 2 and 3 are graphs helpful in comparing the various transmission schemes depicted in FIG. 1;

FIGS. 4–6 are various one-dimensional signal constellations helpful in understanding the prior art approaches to data transmission over the local loop;

FIG. 8 shows the signal constellation used in the duplex wideband network termination of FIG. 7;

FIG. 9 is a table useful in explaining the operation of the coder within the duplex wideband network termination of FIG. 7;

DETAILED DESCRIPTION

Figure 1:
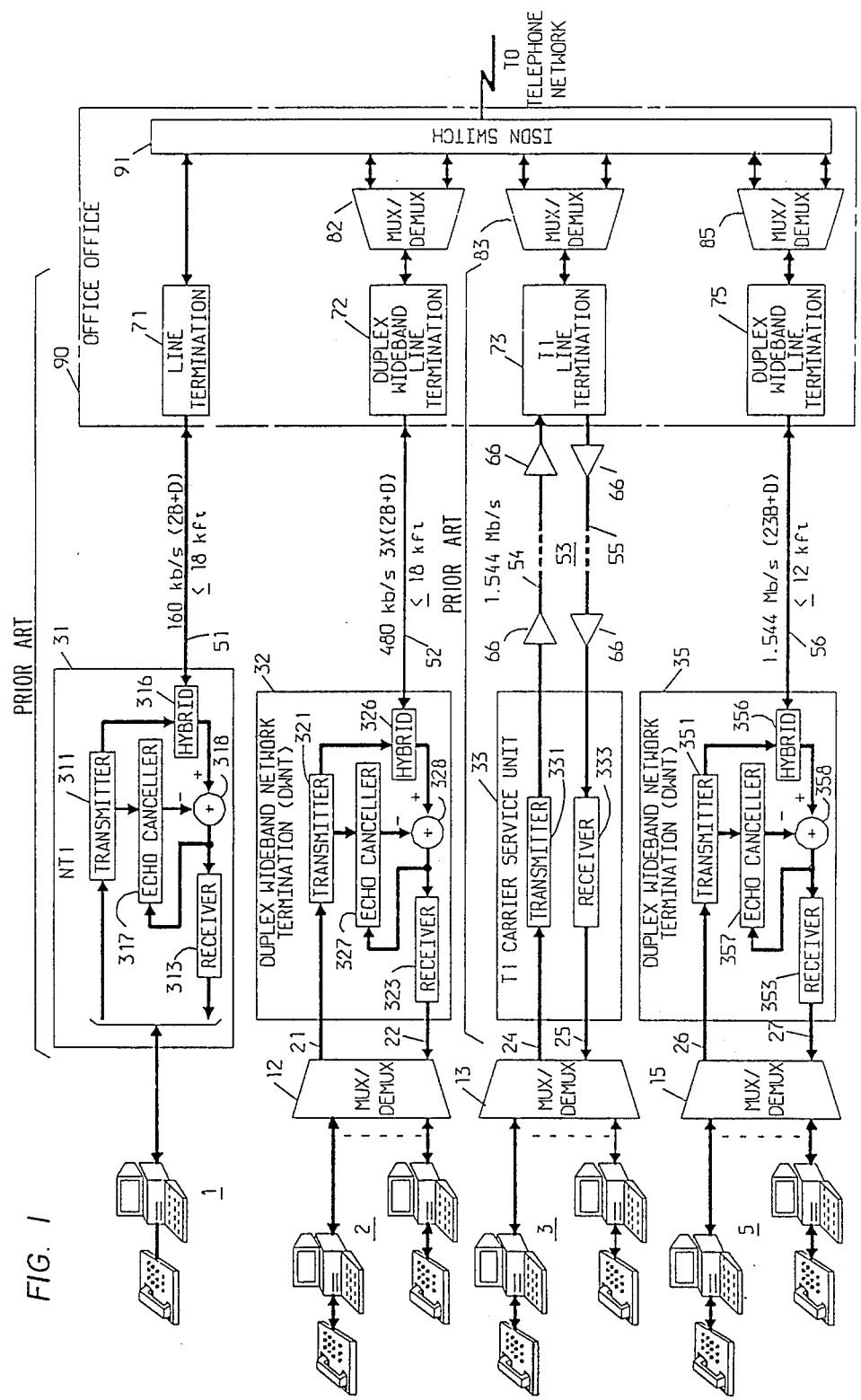
FIG. 1 shows four telephone local loop data transmission schemes, two of which are prior art schemes and two of which embody the principles of the present invention.

In FIG. 1, digital signals originating from various pieces of terminal equipment 1,2,3 and 5 located on respective customer premises are communicated to a telephone central office 90 from which they are routed through the telephone network (not depicted) to their respective destinations. For simplicity, the various pieces of terminal equipment 1,2,3 and 5 are all illustrated as being telephone stations each interconnected with a personal computer. In general, however, each of the various pieces of terminal equipment may comprise any type of digital signal source, such as a simple computer terminal, a cluster controller, a minicomputer, a digital video signal source, etc.

By way of illustration, each of the differently numbered pieces of terminal equipment communicate their data to the central office using a respective different transmission scheme, two of which are prior art schemes and two of which embody the principles of the present invention.

In particular, terminal equipment 1 is comprised of a single telephone/computer combination which generates digital data in the ISDN "basic rate" (2B+D) format. The information data bits themselves, which are at a rate of 144 kb/s, are combined with various framing, maintenance and control bits by circuitry with the terminal equipment itself to generate an outbound data stream at 160 kb/s. This data stream is input to a network termination 31 which utilizes the aforementioned prior art 2B1Q transmission scheme to communicate the data to central office 90 via two-wire local loop 51, the latter having a maximum length of 18 kft per ISDN standards. In ISDN parlance, network termination 31 is referred to as an "NT1" and it will be so denominated hereinafter.

Within central office 90, the ISDN-formatted bit stream is recovered from the transmitted 2B1Q signal by a so-called line termination 71 and is thereupon passed to a digital switch 91 within the central office. Switch 91 is illustratively a 5ESS digital switch manufactured by AT&T which includes software which processes the framing, maintenance and/or control information carried in the so-called "D" channel of the ISDN signal. For this reason, switch 91 is denoted in the FIG. as an "ISDN switch".

In each direction of transmission, the functions performed by line termination 71 and NT1 31 are the opposite of what they are in the other direction. Thus, data from switch 91 destined for terminal equipment 1, also at 160 kb/s, is passed to line termination 71, which generates a 2B1Q line signal representing that data. The line signal is then transmitted over local loop 51 to NT1 31 which then recovers the data and passes it to terminal equipment 1. Indeed, the circuitry within each of these two units is very similar to that in the other and, as far as the generation and processing of line signals is concerned, they may be regarded as being identical.

As specifically shown for NT1 31, that circuitry is principally comprised of a transmitter section 311, a receiver section 313, a hybrid 316 and an echo canceller 317. Outbound data generated by terminal equipment 1 is converted to 2B1Q format by transmitter section 311 and is extended onto loop 51 by way of hybrid 316. At the same time, hybrid 316 directs inbound line signals on loop 51 to receiver section 313. The inbound line signals invariably include so-called echos of the outbound data, the principal echo component being the so-called "near echo" comprised of energy from transmitter 311 which "leaks" through hybrid 316. In order to remove these echos, echo canceller 317 generates an estimate thereof as a function of the stream of outbound channel symbols, which is supplied thereto from within transmitter section 311, and that estimate is substracted from the inbound line signal in a subtractor 318 prior to application of that signal to receiver section 313. The output of subtractor 318 is also used as an error signal by echo canceller 317 to update its transfer function in such a way as to minimize the residual echo in that signal.

As discussed in further detail hereinbelow, the above-described approach for providing 160 kb/s transmission from the customer premises to the central office seems to be commercially viable, but may not be practical for use at higher transmission rates. Attention is thus directed to another prior art transmission scheme, which is used to communicate data at significantly higher rates to central office 90 from terminal equipment 3.

In particular, terminal equipment 3 is comprised of a number of digital signal sources, each of whose output data streams is applied to a multiplexer/demultiplexer (mux/demux) 13. The latter embeds the signals from these sources in an outbound data stream on lead 24, that signal being in the ISDN "primary rate" (23B+D) format. The information data bits themselves, which are at a rate of 1.536 Mb/s, are combined with various framing, maintenance and control bits by circuitry within mux/demux 13 to generate an outbound data stream at the so-called DS-1 rate of 1.544 Mb/s. The signal on lead 24 is communicated to central office 90 by way of transmitter section 331 of T1 carrier service unit 33, outbound two-wire pair 54 of a T1 link 53 and T1 line termination 73, the latter being within the central office itself. The output of T1 line termination 73 is demultiplexed by a mux/demux 83 and the component data streams are thereupon applied to switch 91.

Similarly, in the inbound direction, data from switch 91 destined for the various pieces of terminal equipment 3 are formatted into a primary rate signal by mux/demux 83, also at 1.544 Mb/s, and are passed from switch 91 back to mux/demux 13 by way of T1 line termination 73, inbound two-wire pair 55 of T1 link 53, receiver section 333 of T1 carrier service unit 33 and mux/demux input lead 25. Mux/demux 13 thereupon demultiplexes the signal on lead 25 into its component data streams for distribution to the various pieces of terminal equipment 3 that it services.

As with NT1 31 and line termination 71, the functions performed by T1 carrier service unit 33 and T1 line termination 73 are the opposite of one another in the two directions of transmission and the circuitry within them that generates and processes line signals is substantially identical.

Use of T1 carrier transmission facilities for communicating data at a DS-1 rate of 1.544 Mb/s between a central office and terminal equipment as just described is, indeed, a technically viable approach. As previously mentioned, however, it is a very expensive approach, owing principally to the need for regenerators, denoted as 66, spaced at no greater than 6 kft intervals, as discussed hereinabove.

The present invention, by contrast, provides a mechanism for communicating data over unrepeatered, two-wire local loops (a) at speeds significantly in excess of that which can be provided using, for example, a pulse amplitude modulation (PAM) transmission scheme, such as 2B1Q, and (b) at low cost. Specifically, our invention enables data to be transmitted at at least three times the ISDN basic rate, i.e., at at least 480 kb/s, over an 18 kft loop and at at least the ISDN primary rate of 1.544 Mb/s over a 12 kft loop.

In order to explain the principles of the present invention, attention is now directed to FIGS. 2-3.

In particular, curves 211 and 213 in FIG. 2 show the amplitude response in dB, as a function of frequency, of typical 24 gauge telephone local loops of length 12 and 18 kilofeet (kft), respectively. As is evident from these curves, the loss in the loop increases as a function of signal frequency. Curve 216 is a typical near-end crosstalk transfer function, which shows that the level of crosstalk reflected into a particular loop from other loops in the same cable increases with frequency—specifically as a function of the 3/2 power of the frequency—this being the result of inductive and capacitive coupling in the telephone cables.

Given the curves of FIG. 2, it is possible to analyze the performance characteristics of the local loop transmission schemes known in the prior art.

Consider, for example, the particular transmission scheme used in the Digital Data System (DDS) as described above. As previously noted, this is a bipolar transmission scheme, meaning that the transmitted signal can take on one of two non-zero levels. The signal constellation, i.e., the assemblage of possible transmitted signal points, for this scheme is shown in FIG. 4. At a transmission rate of 160 kb/s, the spectrum of such a signal looks like curve 361 of FIG. 3. (Depending on the implementation, a bipolar signal spectrum may have a second lobe at higher frequencies. It is assumed for purposes of the present discussion that that lobe is filtered out of the line signal prior to transmission as, indeed, is often the practice.)

Used in conjunction with standard adaptive equalization and echo cancellation, a bipolar transmission scheme is a commercially feasible approach for 160 kb/s because the level of near-end crosstalk introduced into such a signal is sufficiently low that an acceptably low probability of error is easily achievable. A bipolar transmission scheme is not, however, commercially feasible in local loop environments at frequencies significantly higher than 160 kb/s, e.g., three times that rate, or 480 kb/s. This is because the spectrum of a bipolar signal is coextensive with the bit rate. That is, the spectrum of a bipolar signal at 480 kb/s would extend out to 480 kHz, or even higher if the aforementioned second lobe is not filtered out of the transmitted line signal. Since, as shown by the shape of curve 216, the transfer function of the near-end crosstalk increases with frequency, the level of such crosstalk at 480 kHz would so corrupt the line signal as to make it virtually impossible to achieve acceptable error performance over most loops.

As another approach, consider a four-level PAM transmission scheme, such as the 2B1Q scheme proposed for ISDN, as discussed earlier. The signal constellation for this scheme is shown in FIG. 5. Again, this approach is a commercially feasible transmission scheme for 160 kb/s transmission. Specifically, the four-level format means that each signaling pulse carries two bits of information, yielding a symbol rate of 80 kbaud. An illustrative spectrum for this signal is represented by curve 362 of FIG. 3. The upper frequency limit of the 2B1Q signal is well below the 160 kHz upper limit of the bipolar 160 kb/s signal spectrum, thereby making it all the more immune to near-end crosstalk than the bipolar signal. Unlike the bipolar signal, however, the PAM signal has a significant energy component down to very low frequencies. This may be a problem in a certain, albeit probably relatively small, number of connections due to the presence at the lower frequencies of voice crosstalk and perhaps impulse noise caused by switching equipment, power supplies, etc. In general, however, the signal points of a four-level PAM signal can be spaced sufficiently apart from one another in local loop applications that achieving a commercially acceptable level of error performance, e.g., a bit error rate of $10^{-6}$, should not be a significant problem using such a signal.

Consider, now, using a PAM transmission scheme in this environment at significantly higher bits rates, such as 480 kb/s. For example, 480 kb/s PAM can be provided using eight levels and three bits per symbol at 160 kbaud. The spectrum of such a signal is shown as curve 367 in FIG. 3 and the signal constellation thereof in FIG. 6. Here, a more bandwidth efficient signal shaping scheme, using a smaller excess bandwidth than for the 160 kb/s PAM scheme, is illustratively employed so that the spectrum has a much sharper rolloff. Again, near-end crosstalk would not be a significant problem. There would be a bit more concern about an eight-level PAM scheme, as compared to the four-level, because the transmitted line signal is subject to maximum power level constraints and, therefore, in order to increase the number of signal points in the constellation from four to eight, the points would have to be closer together than in the four-level case. This can be seen from a comparison of FIGS. 5 and 6. In general, however, it may well be the case that the error performance of the eight-level PAM will be at an acceptable level.

Using a PAM scheme, however, does have other, potentially more serious, limitations. One problem relates to the fact that the group delay of the near echo channel transfer function—which characterizes the near echo appearing at the input of the receiver section, e.g., receiver section 313 (FIG. 1), as a function of the transmitted signal increases dramatically in the voiceband region at the low end of the spectrum. This increase in group delay results from particular pole/zero combinations in the transfer function caused principally by the presence of the hybrid, e.g., hybrid 316, in the near echo channel. This large group delay means that the impulse response of the echo channel in the low-frequency region will extend over a significantly longer time interval than in the higher-frequency regions, where there is much less group delay. Thus, the effect of a particular symbol in the echo signal is manifested for a longer period of time in the low-frequency components of the echo. In order for the echo canceller to effectively synthesize such low-frequency components, then, the memory in which it stores the transmitted symbols must span a greater number of symbol intervals than it would if the group delay at low frequencies was not as large as it is.

In turn, the requirement of an increased number of symbol intervals in the echo canceller memory span means that the so-called adaptation step size used in the coefficient updating algorithm within the echo canceller—e.g., the parameter $\alpha$ in U.S. Pat. No. 4,464,545 cited below—must be made smaller in order to maintain a particular level of echo cancellation. Disadvantageously, decreasing the step size means that the arithmetic used in the echo canceller must be carried out at a higher level of precision, i.e., to a greater number of fractional places. This adds not insignificantly to the cost of implementing the echo canceller. Moreover, using a smaller step size reduces the capability of the echo canceller to adapt to time variations in the echo channel.

It is not believed that this effect precludes an acceptable level of echo canceller performance using a PAM transmission scheme at a 40 kbaud symbol rate. The problem gets worse, however, as the symbol rate is increased. The reason for this is that as the symbol rate is increased, the symbol interval correspondingly decreases. Thus the memory span in the echo canceller, although always extending over the same time period—as determined by the time duration of the low frequency impulse response as previously discussed—will now extend over an increased number of symbol intervals. Again, this necessitates an even smaller adaptation step size, as previously noted. Thus, the above-discussed problems relating to arithmetic precision and the ability to adapt to time variations in the echo channel are exacerbated. Indeed, the capability of the echo canceller to adapt to time variations in the channel may be so compromised as to make the acceptable echo canceller performance difficult or impossible to achieve at, for example, an 80 kbaud symbol rate.

Another limitation with PAM in this environment relates to the existence in the local loop of a well-known phenomenon referred to as "dc wander", wherein the average value of signals on the loop tends to drift up and down over time, resulting from the fact that hybrids cannot pass signals at or close to dc. The effect of this dc wander on receiver performance becomes more pronounced as the number of bits per symbol is increased because the number of signal points in the constellation would have to be correspondingly increased and thus the minimum distance between them would have to be decreased. (On the other hand, keeping the number of bits per symbol the same and increasing the symbol rate would exacerbate the above-discussed echo canceller step size problem.) Unfortunately, automatic gain control (AGC) circuits—which might otherwise be used to track such time-varying channel effects as dc wander and thus remove them—cannot be used effectively in echo cancellation applications.

One possible approach to solving the foregoing problems might be to create a null at dc in the PAM signal (using known bit coding techniques), thereby minimizing the energy at or near dc in the first instance. Indeed, it appears that this approach is being taken by engineers currently designing circuitry to implement 2B1Q. Disadvantageously, however, such solutions, although they ameliorate the problem, do not completely solve it.

All in all, then, use of a PAM transmission scheme over an 18 kft ISDN loop at, for example, 480 kb/s or higher, appears highly problematic and, indeed, may not be achievable. In addition, if the desire is to transmit at bit rates significantly higher than 480 kb/s, e.g., the DS-1 rate of 1.544 Mb/s, the necessity of spacing the PAM signal points even closer together may well mean that the signal would have insufficient margin against low-frequency noise and residual dc wander to provide a commercially acceptable level of error performance.

In accordance with the present invention, we have realized that passband transmission of the type that has been used for many years in, for example, voiceband data transmission and digital radio systems can be employed in an environment—local loop transmission—where the age-old standard has been baseband transmission, in order to provide for data transmission speeds significantly greater than that provided by current technology while still achieving an acceptable level of error performance.

The spectrum of such a signal is shown as curve 365 in FIG. 3. In particular, curve 365 represents the spectrum of a two-dimensional signal which can accommodate a 480 kb/s, 6-bit-per-symbol data stream within a bandwidth of approximately 80 kHz. In accordance with a feature of the invention, this signal may advantageously be a carrierless amplitude-and-phase modulated (AM/PM) signal as described in further detail hereinbelow. Unlike the spectrum of a baseband signal, such as represented by curves 362 and 367, the spectrum of a passband signal falls off at low frequencies. Moreover, a passband signal can be positioned at any desired location in the frequency spectrum. Advantageously, then, the passband signal represented by curve 365 can be so positioned within the frequency spectrum as to minimize the added noise, taking into account both low frequency noise such as impulse noise and voice crosstalk, and high frequency noise, such as near-end crosstalk (which arises from other signals of like spectrum in neighboring loops within the same cable). In addition, since the passband signal does not include signals at or near dc, all of the various factors discussed above as rendering difficult, expensive and/or not practical the ability to use PAM or other baseband transmission schemes at rates significantly in excess of the ISDN basic rate do not exist.

Moreover, in order to enhance the receiver's margin against noise, we have realized that trellis codes (or other codes that provide so-called "coding gain"), in conjunction with conventional Viterbi decoding in the receiver, can be employed in this local loop transmission environment just as they are already used in voiceband data transmission, for example.

At data rates significantly higher than 480 kb/s, such as the DS-1 rate of 1.544 Mb/s used with the ISDN (23B+D) format, it may not be possible, given current technology and the characteristics of local loops as they currently exist, to achieve an acceptable level of error performance over an 18 kft local loop, even given the approach of the present invention. The reason is that such a bit rate implies a significant increase in the symbol rate and/or a significant increase in the number of points in the signal constellation. As seen from curve 216 of FIG. 2, significantly increasing the symbol rate would result in a significant increase of near-end crosstalk, thereby reducing the signal-to-noise ratio to a point that acceptable error recovery might not be possible. On the other hand, significantly increasing the number of points in the signal constellation would mean that the points of the constellation would be much closer together, thereby increasing the receiver's signal-to-noise ratio requirement to a level not achievable given the capabilities of current technology.

In order to obtain the benefits of the present invention at such high rates, it will thus probably be necessary to put more stringent limitations on the loop over which the line signal is transmitted. For example, it will probably be necessary to limit the loop length so that the maximum attenuation, or loss, in the channel will be smaller and thus the signal-to-noise requirement of the receiver can be satisfied. Note from curve 211 of FIG. 2 that the loss introduced by a 12 kft loop at a symbol rate of 257.33 kbaud—which would be the symbol rate needed to support data at 1.544 Mb/s, again assuming a 6-bit-per-symbol scheme—is quite close to loss introduced by an 18 kft loop at an 80 kbaud symbol rate. Thus it is expected that the signal-to-noise ratio, at the receiver input, for a line signal carrying a 1.544 Mb/s bit stream over a 12 kft loop should not be much lower than the signal-to-noise ratio for a line signal carrying a 480 kb/s bit stream over an 18 kft loop.

In addition, in order to ensure adequate performance at, for example, a 1.544 Mb/s data bit rate, it may be desirable to place further restrictions on the loop. For example, it may be desirable to limit the number and placement of so-called bridge taps, whose presence introduces additional amplitude distortion in the channel. It may also be desirable to limit the use and character of mixed wire gauges, which can create additional echos in the received line signal. In regard to these further loop restrictions, as well as the 12 kft maximum loop length, we believe that if the loop meets the already-established design requirements for so-called "carrier serving area" (CSA) loops, a network termination embodying the principles of the invention can, indeed, be used to communicate 1.544 Mb/s data over the local loop with acceptable error performance.

The aforementioned CSA design requirements are, in particular, as follows:

(1) Only non-loaded cable can be used.

(2) 26 AWG cable, whether used alone or in combination with other gauge cables, should not exceed a total length of 2.73 km (9 kft) including so-called bridge taps (spurs).

(3) For single gauge 19,22 and 24 AWG cable, the total length including bridged taps should be less than 3.66 km (12 kft).

(4) The total bridged tap length should not exceed 0.762 km (2.5 kft) and no single tap should exceed 0.609 km (2.0 kft) in length.

(5) Multi-gauge cable is restricted to two gauges.

Referring now back to FIG. 1, terminal equipment 2 is comprised of a number of digital signal sources whose output streams are applied to mux/demux 12. The latter embeds the signals from these sources in an outbound 480 kb/s data stream on lead 21. That data stream could be formatted, for example using an ISDN-type format, although an ISDN standard for 480 kb/s has not yet been adopted. The data stream on lead 21 is input to a network termination 32, which embodies the principles of the invention. Network termination 32 is more specifically referred to herein as a duplex wideband network termination, or DWNT. The latter communicates its input data to central office 90 via two-wire local loop 52 which, like loop 51, has a maximum length of 18 kft per ISDN standards. Within central office 90, the bit stream is recovered from the transmitted line signal by a duplex wideband line termination, or DWLT, 72 and, after being demultiplexed by mux/demux 82, is passed to digital switch 91. At the same time, 480 kb/s digital signals are passed from switch 91 back to terminal equipment 2 via mux/demux 82, DWLT 72, local loop 52, DWNT 32 and mux/demux 12.

As with NT1 31 and line termination 71, the functions performed by DWNT 32 and DWLT 72 in each direction of transmission are the opposite of what they are in the other direction. Moreover, as far as the processing of line signals is concerned, DWNT 32 and DWLT 72 may be regarded as substantially identical. In addition, DWNT 32 has a structure generally similar to that of NT1 31. Thus, in particular, DWNT 32 includes a transmitter section 321, a receiver section 323, a hybrid 326 and an echo canceller 327. What principally distinguishes DWNT 32 from NT1 31 is the fact that the former uses a passband transmission scheme, in accordance with the invention, as previously discussed, in order to achieve 480 kb/s transmission over the 18 kft local loop.

Further in accordance with the invention, terminal equipment 5 communicates with switch 91 via mux/demux 15, DWNT 35, local loop 56, DWLT 75 and mux/demux 85. Mux/demuxes 15 and 85 could be arranged to operate, for example, in ISDN (23B+D) mode or, alternatively, the so-called non-channelized ISDN packet mode, or NIPM. As before, DWNT 35 and DWLT 75 are substantially identical to one another and, again, use a passband transmission scheme. The latter differs from the passband transmission scheme used in DWNT 32 in that, although it also uses six bits per symbol, it employs a symbol rate of 257.33 kbaud, thereby achieving a 1.544 Mb/s bit rate. Terminal equipment 5 may thus be comprised of more data sources than, say equipment 2 or may include sources that generate data at higher bit rates.

In order to accommodate this bit rate, local loop 56 is illustratively limited to a maximum length of 12 kft, as previously described. If, on the other hand, it were desired to provide 1.544 Mb/s data communication capability over distances greater than 12 kft, this could be easily accomplished by, for example, terminating the two-wire loop at a DWNT which feeds its digital output into a four-wire repeatered system, such as a so-called "subscriber line carrier" system (SLC), extending back to the central office.

Figure 7:
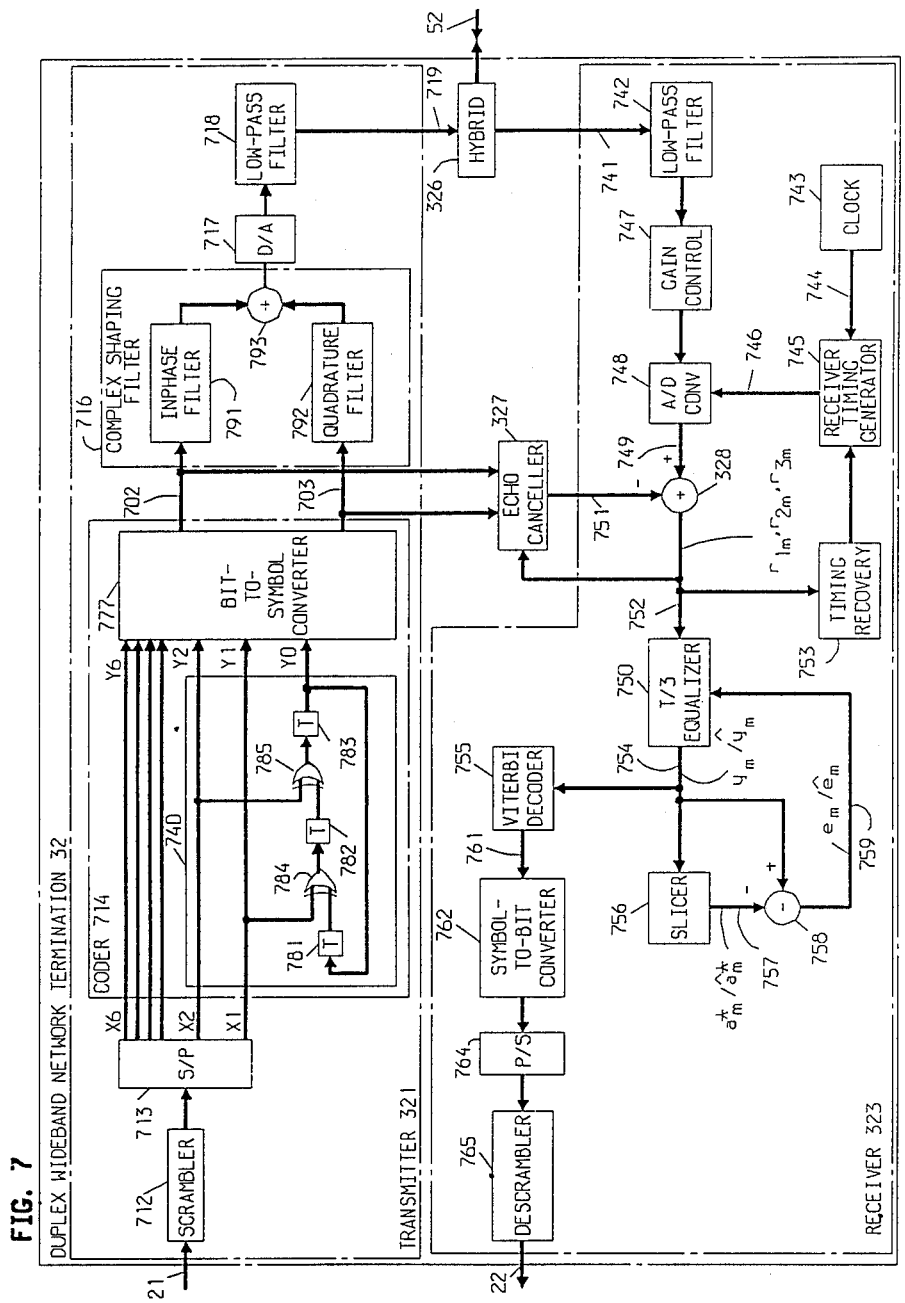
FIG. 7 is a block diagram of a duplex wideband network termination used in one of the transmission schemes of FIG. 1 and embodying the principles of the invention.

By way of example, FIG. 7 shows a block diagram of duplex wideband network termination 32. It will be appreciated, however, that duplex wideband network termination 52 will be substantially identical thereto at the level of detail being presented, the major difference being the symbol rate at which they operate. Indeed, a DWNT embodying the principles of the invention can be manufactured with the capability of operating over a range of bit rates, with the bit rate actually used at a particular time being either selected manually via, say, a front panel control or adaptively by the DWNT/DWLT pair themselves during their start-up sequence.

Specifically, the 480 kb/s signal received by transmitter section 321 within DWNT 32 on lead 21 is applied therewithin to a scrambler 712. The latter, in conventional fashion, randomizes the data so as to eliminate the possibilities of generating tones within the line signal ultimately to be generated. Scrambler 712 may be, for example, of the type shown in U.S. Pat. Nos. 3,515,805 issued Jun. 2, 1970 to R. Fracassi and 4,304,962 issued Dec. 8, 1981 to R. Fracassi et al. Scramblers of this type are also described in polynomial form in CCITT V.32 Recommendation, "A Family of 2-Wire, Duplex Modems Operating at Data Signaling Rates of up to 9600 Bit/s for Use on the General Switched Telephone Network and on Leased Telephone-Type Circuits," *Red Book, Volume VIII - Fascicle VIII-1, Data Communications Over the Telephone Network, VIII$^{th}$ Plenary Assembly*, Malaga-Torremolinos, pp. 221–238, Oct. 8–19, 1984. the output bits of scrambler 712, still at a 480 kb/s rate, are thereupon converted to six-bit words by serial-to-parallel converter 713, the bits of each such word being denoted X1 through X6. These six-bit words, occurring at $480,000 \div 6 = 80,000$ per second, are thereupon mapped by a coder 714 into a stream of channel symbols—one symbol for each word—yielding a symbol rate of 80 kilobaud.

Figures 8, 9:
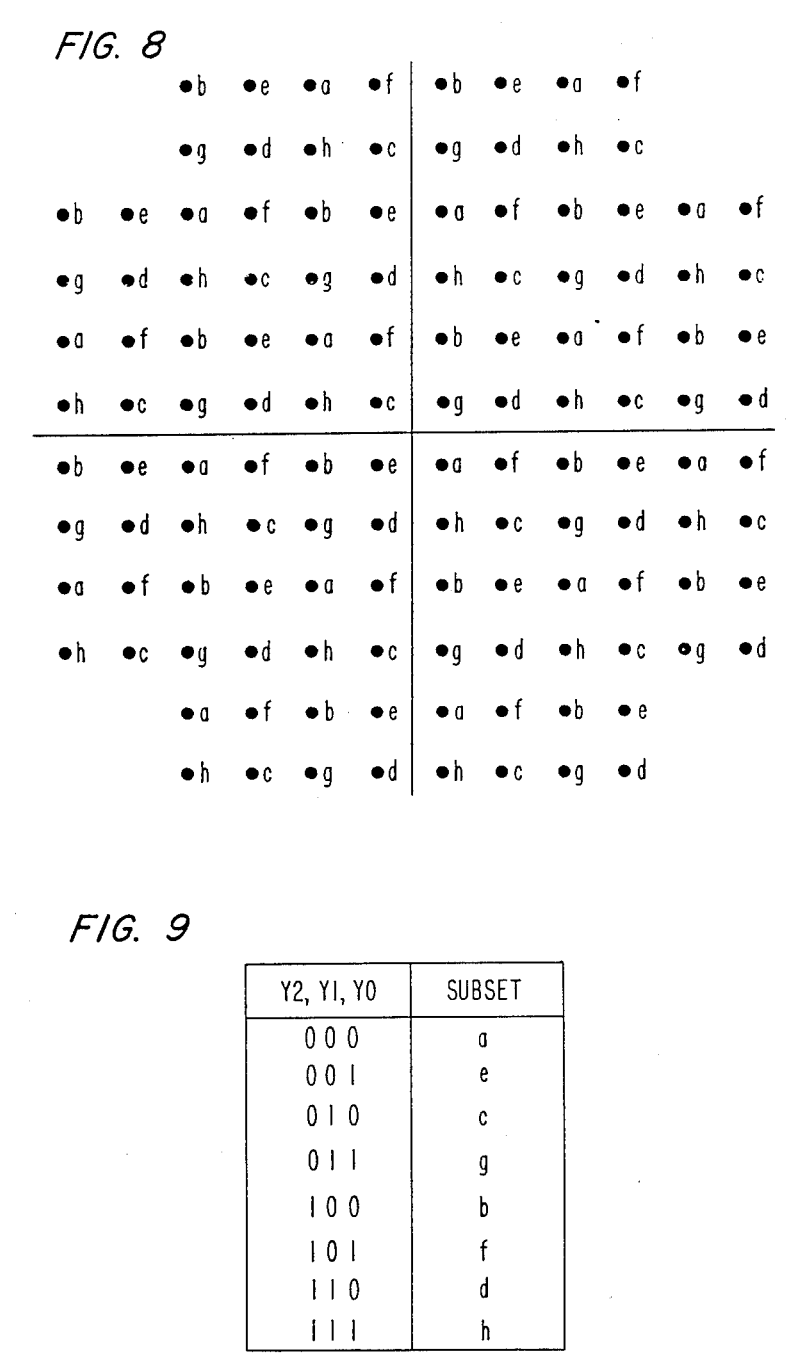

Specifically, coder 714 expands the six-bit words received from serial-to-parallel converter 713 into seven-bit words comprised of bits Y0 through Y6. Bits Y0, Y1 and Y2 are generated by a trellis coder 740 within coder 714 in response to bits X1 and X2, as described in further detail hereinbelow, while bits Y3 through Y6 are identical to bits X3 through X6. Still within coder 714, bits Y0 through Y6 are applied to bit-to-symbol converter 777, which maps each of the $2^7 = 128$ different combinations of the values of those bits into one of a predetermined constellation of 128 two-dimensional channel symbols shown in FIG. 8. More specifically, each of the 128 channel symbols of the constellation is assigned to a particular one of eight partitions, or subsets, labelled a through h, as denoted in the FIG. The values of bits Y0, Y1 and Y2 identify, in accordance with the assignment scheme shown in FIG. 9, the particular one of the eight subsets the symbol currently being identified is to come from while the values of bits Y3 through Y6 identify a particular one of the sixteen symbols within the identified subset.

The assignment of each of the sixteen different combinations of the values of bits Y3 through Y6 to a particular symbol within the identified subset can be arbitrary. However, by appropriate choice of (a) the so-called trellis code used by trellis coder 740 to generate bits Y0, Y1 and Y2, (b) the constellation, and (c) the partitioning of the constellation into particular subsets, so-called "coding gain" is achieved. Such coding gain manifests itself in the form of enhanced receiver immunity to channel noise as compared to the channel noise immunity of an "uncoded" system in which each symbol of (in this example) a 64-symbol constellation would be used to directly represent a different one of the $2^6 = 64$ different combinations of the values of bits X1 through X6.

A circuit embodiment of trellis coder 740 is explicitly shown in FIG. 7. Specifically, trellis coder 740 is a finite-state machine which includes delay elements 781, 782 and 783 and exclusive-OR gates 784 and 785. Each of the delay elements imparts a symbol interval delay of T seconds to its inputs, where T is the reciprocal of the symbol rate, i.e., $T = 1/80,000$. The inputs of exclusive-OR gate 784 are bit X1 and the output of delay element 781. The inputs of exclusive-OR gate 785 are bit X2 and the output of delay element 782. Delay element 781 receives as its input the output of exclusive-OR gate 784; and delay element 783 receives as its input the output of exclusive-OR gate 785. The output of delay element 783 also serves as output bit Y0.

The underlying premise of trellis coding is that, at any point in time, only the points in particular subsets of the constellation are allowed to be transmitted, depending on the so-called state of the trellis coder. The trellis diagram of FIG. 10, for example, represents the operation of trellis coder 740.

Figure 10:
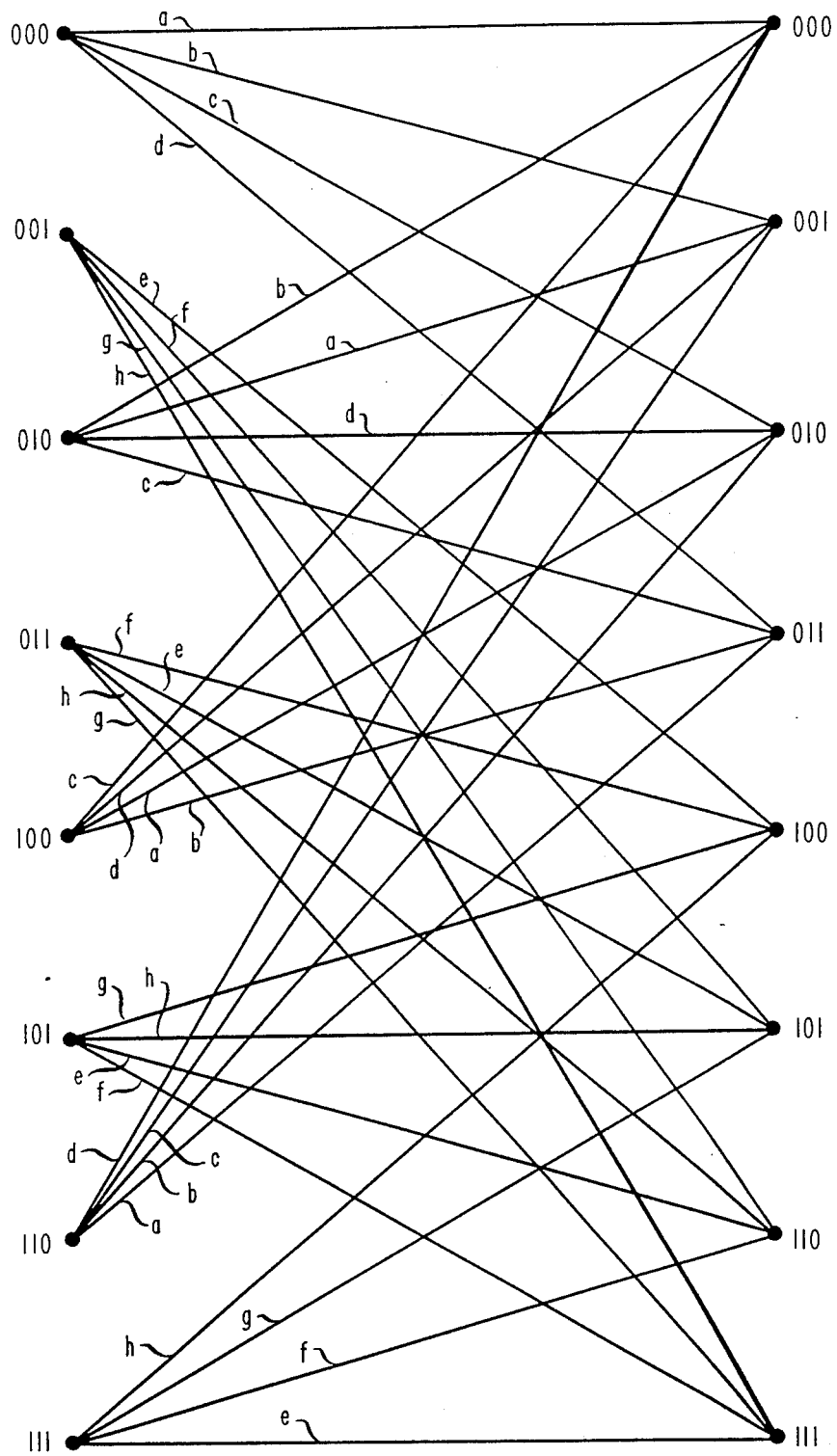
FIG. 10 is a trellis diagram graphically depicting the so-called convolutional code used in the duplex wideband network termination of FIG. 7.

In particular, trellis coder 740 has eight "states", binary 000 through binary 111, given by the values of the bits currently stored in delay elements 781, 782 and 783. Thus, for example, if the coder is in state 001, this means that delay elements 781 and 782 each currently hold a "0" and delay element 783 currently holds a "1". The two vertical lines of points in FIG. 10 represent the eight possible coder states at successive time intervals, and the lines, or edges, connecting various pairs of states indicate the possible state transitions. Thus, for example, it is possible for the coder to transition from state 010 to state 001 but not to state 100.

Each of these connecting lines bears a label indicating which subset the symbol being generated is to come from. Thus, continuing the example above, assume that the current state of the coder—i.e., the contents of delay elements 781, 782 and 783—is 010 and that, after the next six-bit word is supplied by serial-to-parallel converter 713, the new state is state 001. This means that the next signal point to be output is to come from subset "a" since the line connecting state 001 in the left column to state 111 in the right column is so labeled. With the coder now in state 001, the next signal point to be output will come from one of the subsets "e", "f", "g" or "h", depending on the upcoming values of X1 and X2.

The trellis codes that have developed to date, including, for example, the code represented by the trellis diagram of FIG. 10, are known to provide coding gain in the presence of Gaussian, or "white", noise. In the local loop environment, by contrast, colored, rather than white, noise—arising from crosstalk within the transmission cable—is the dominant noise type. We nonetheless believe that the use of this particular code in the local loop environment will still provide a significant measure of coding gain. If, in the future, techniques are developed which will enable one to design codes optimized for a colored noise environment, the use of trellis or similar codes will be of even greater benefit in a DWNT.

Bit-to-symbol converter 777 provides on its output leads 702 and 703 the so-called in-phase and quadrature phase components, respectively, of the channel symbol identified by bits Y0-Y6. In terms of the constellation diagram of FIG. 8, these components represent the "x" and "y" components of the selected symbol. Leads 702 and 703 extend to complex shaping filter 716, which generates the passband signal whose spectrum is represented by curve 365 in FIG. 3. As previously mentioned, that signal is, in accordance with a feature of the invention, illustratively a carrierless AM/PM signal.

Implementationally, complex shaping filter 716 is illustratively comprised of two finite-impulse-response digital filters of conventional design—in-phase filter 791 and quadrature phase filter 792—which filter the signals on leads 702 and 703, respectively. Each of these filters is illustratively realized as a transversal filter which generates a passband signal having a frequency domain amplitude characteristic substantially as shown by curve 365. Filters 791 and 792 differ from each other only in that their phase characteristics are offset from one another by $\pi/2$. This phase difference enables the receiver section of DWLT 72 to separately reconstruct the signals on leads 702 and 703. The outputs of filters 791 and 792 are combined in an adder 793 to provide a digital version of the desired outbound line signal.

It is important to note that the approach taken within complex shaping filter 716 for generating a passband signal in response to the two-dimensional symbols represented by the signals on leads 702 and 703 is different from the modulation typically used in, for example, voiceband modems, such as quadrature amplitude modulation, or QAM. In the latter, specifically, an explicit or implicit (depending on the implementation) rotation of the symbols by a carrier-frequency-dependent angle occurs. However no such explicit or implicit rotation is performed with carrierless AM/PM. This is significant because unless there happens to be an integral relationship between the carrier frequency and the symbol interval T (which is not likely to be the case if the carrier frequency and symbol interval values are chosen to optimize the performance of the transmission scheme as a whole), the aforementioned rotation operation will involve a non-trival multiplication, thereby adding not insignificantly to the cost of the transmitter section. A further advantage is that carrierless AM/PM is more simply processed at the receiver than, for example, QAM. Additionally, carrierless AM/PM is potentially more robust in the presence of nonlinearities, such as may be introduced in the analog-to-digital conversion performed in the receiver.

The output of complex shaping filter 716 is converted to analog form by D/A converter 717 whose output is then passed through low pass filter 718 to remove the higher-frequency images of the desired signal. Hybrid 326 thereupon extends the resulting outgoing line signal appearing on transmitter section output lead 719 to its two-wire side and thence onto local loop 52.

Turning now to the inbound transmission direction, the line signal generated on local loop 52 by duplex wideband line termination 72 is received by hybrid 326 which routes that signal on to receiver section 323 and, more particularly, low-pass filter 742 thereof. The latter filters out energy in the received signal at frequencies nominally above the spectrum of the transmitted signal. The resulting filtered signal passes to gain control circuit 747 which is programmable to adjust the gain imparted to its input so as to make maximum use of the precision of A/D converter 748 which follows. The gain of circuit 747 is set, based on the level of its input signal during modem initialization or retraining, and is thereafter held at the initially set value, in accordance with standard practice for echo-canceller-based data communications.

Receiver section 323 further includes a clock 743, which generates a predetermined number of clock pulses every T seconds on lead 744. These are received by receiver timing generator 745, which counts the pulses on lead 744 and generates timing signals on a number of output leads to control the sequencing of the various signal processing functions within the receiver.

One of these leads, shown explicitly, is lead 746. The latter extends pulses to A/D converter 748 at a rate which causes A/D converter 748 to generate on its output lead 749 samples of the received signal, referred to as "line samples", at 3/T samples per second.

Each of the samples on lead 749 includes an echo component that is dominantly comprised of so-called "near echo" in the form of energy on transmitter section output lead 719 that "leaks" through hybrid 326 and is secondarily comprised of so-called "far echo" arising from reflections of the transmitted signal in the transmission channel. Echo canceller 327, in response to the symbols represented on leads 702 and 703, generates digital samples each representing the echo component of a respective one of the samples on lead 749. This echo replica signal is subtracted from the samples on lead 749 in subtractor 328 to provide an echo-compensated signal on lead 752. (note that, for convenience of illustration, subtractor 328, along with the circuitry which precedes it, is illustratively shown as being within receiver section 323—a minor difference in representation of DWNT 32 in FIGS. 1 and 7.)

The echo compensated signal on lead 752, in addition to being further processed as described below to recover the bit stream communicated from mux/demux 82 (FIG. 1), is also used by echo canceller 327 as an error signal in response to which it adapts its transfer function in such a way as to minimize the residual echo component of the signal on lead 752. Echo canceller 327 is illustratively of the type shown in U.S. Pat. No. 4,464,545 issued Aug. 7, 1984 to J. Werner, hereby incorporated by reference. Among its more significant parameters, echo canceller 327 illustratively has a memory span of 40 symbols, adaptation step size of $2^{-20}$ and arithmetic precision of 26 bits using fixed point arithmetic. These parameters are expected to provide at least 65 dB of near echo attenuation, this being the likely minimum necessary level of near echo cancellation for this application.

The three line samples on subtractor output lead 752 generated during the $M^{th}$ receiver symbol interval are denoted $r_{1m}$, $r_{2m}$ and $r_{3m}$. These line samples are passed to adaptive equalizer 750 for further processing, as described below. It may be noted at this point, however, that line samples $r_{1m}$, $r_{2m}$ and $r_{3m}$ are also applied to timing recovery circuit 753, which uses them to control timing generator 745. (Other types of timing recovery schemes, such as those employing out-of-band tones or other out-of-band signals might alternatively be used.) Although, as noted above, the DWLT 72 may be regard as substantially identical to DWNT 32, one small difference is that DWLT 72 illustratively does not include a timing recovery circuit corresponding to timing recovery circuit 753. Rather, the receiver timing generator in DWLT 72 operates exclusively in response to the clock therein, the latter, in turn, being controlled by a network timing signal provided from within central office 90. The frequency of the clock in DWLT 72 thus becomes the controlling frequency for the operations of both the transmitter and receiver sections of both DWLT 72 and DWNT 32.

As previously noted, line samples $r_{1m}$, $r_{2m}$ and $r_{3m}$ are further processed by adaptive equalizer 750. Equalizer 750 is of conventional design and may be, for example, of the type disclosed in U.S. Pat. No. 4,247,940 issued Jan. 27, 1981 to K. H. Mueller et al, hereby incorporated by reference. Since equalizer 750 receives and processes more than one input for each symbol interval, it is referred to as a "fractionally spaced" equalizer. It is, more specifically, referred to as a T/3 type of fractionally spaced equalizer since it receives and processes inputs at a rate of three per symbol interval, and thus has a so-called "tap" spacing of T/3. A fractionally spaced equalizer is advantageous as compared to a so-called synchronous or symbol-interval-spaced equalizer because, for example, it is insensitive to phase distortion in the channel and to the epoch with which the line samples are formed. Moreover, in this particular embodiment, a T/3 fractionally spaced equalizer is used because it avoids aliasing of the sampled signal that would occur if, say, a T/2 tap spacing were used. The outputs of equalizer 750 on lead 754 are generated once per symbol interval and are, respectively, the real and imaginary components $y_m$ and $y_m$ of complex recovered signal point $Y_m$. Among its more significant parameters, equalizer 750 illustratively has a memory span of 22 symbols, adaptation step size of $2^{-12}$, and arithmetic precision of 16 bits using fixed point arithmetic.

Returning now to FIG. 7, complex recovered signal point $Y_m$ will, in general, be somewhat displaced in the complex plane from the corresponding transmitted symbol. This is due to such factors as (a) the inability of equalizer 750 to perfectly compensate for channel distortion and (b) noise added to the transmitted signal both in the channel and within DWNT 32 itself—the latter being discussed in further detail hereinbelow. In order to identify the transmitted symbols, components $y_m$ and $y_m$ are fed into a Viterbi decoder 755 of a type described, for example, in G. Ungerboeck, "Channel Coding With Expanded Signal Sets," *IEEE Trans. on Information Theory*, Vol. IT-28, No. 1, Jan. 1982, and G. Ungerboeck, "Trellis-Coded Modulation With Redundant Signal Sets, Part I and II," *Communications Magazine*, IEEE Communication Society, Feb. 1987. Also of interest is the discussion in G. D. Forney, "The Viterbi Algorithm", *Proceedings of the IEEE*, Vol. 761, pp. 268–278, Mar. 1973. Decoder 755 operates on successive signal points output by equalizer 750 to form decisions, based on its knowledge of the trellis code used in coder 740, as to what the most likely sequence of transmitted two-dimensional symbols was. Signals identifying those symbols are output by Viterbi decoder 755 on lead 761 to symbol-to-bit-converter 762 which performs the inverse function of bit-to-symbol converter 777, thereby recovering the values of bits Y0 through Y7. Since the values of Y0 through Y6 are identical with the values of X0 through X6, these values can be directly passed through parallel-to-serial converter 764 and descrambler 765 in order to provide the bit stream that was input to duplex wideband line termination 72. Descrambler 765 may be of the type described in the above-cited Fracassi patents and CCITT standard.

Equalizer 750 uses as an input an error signal indicative of the difference between the recovered signal points on lead 754 and decisions thereafter made in the receiver as to what the transmitted symbols actually were. The most accurate way to generate that error is to use the decisions made in Viterbi decoder 755. However, there is a significant delay in Viterbi decoder 755. As a result, using the decisions formed in Viterbi decoder 755 would, for example, necessitate the use of a smaller step size in the equalizer coefficient updating relations (the factor $\beta$ in the above-cited U.S. Pat. No. 4,247,940) than is optimum for tracking time variations in the transmission channel.

As an alternative, receiver section 323 includes a slicer 756 which provides on its output lead 757 quantized versions of $y_m$ and $y_m$, denoted $a_m^*$ and $a_m^*$. These so-called "tentative" decisions may occasionally vary from the corresponding decisions ultimately arrived at in Viterbi decoder 755 as to the values of the corresponding transmitted symbol. The tentative decisions are, however, a sufficiently accurate measure of what the final decisions will be that they can be advantageously used for equalizer error generation. To this end, a subtractor 758 provides on its output lead 759 the real and imaginary components of a complex error signal $E_m$ having real and imaginary components $e_m$ and $e_m$, where $e_m = (y_m - a_m^*)$ and $e_m = (y_m - a_m^*)$. The complex error signal $E_m$ is supplied to equalizer 750 for the purpose of coefficient updating in conventional manner.

We turn at this point to certain implementation issues:

There are two types of noise that limit the performance in virtually all digital data communications equipment. One of these is the noise in the communication channel, as previously discussed. The other is the noise generated within the circuitry which implements the equipment. Various components of such internal noise include, for example, (a) quantization noise arising at analog-to-digital and digital-to-analog interfaces, (b) Gaussian and nonlinear noise introduced by analog circuitry such as hybrids and lowpass and/or bandpass filters, and (c) noise induced in power supply voltages and common grounds as the result of digital circuit switching. Radiation-induced noise is a possible further concern. The level of this internal noise is referred to as the "noise floor" and is typically expressed as some number of dB below the maximum level of the signal at the input to the receiver section.

In order to accurately recover the data embedded in the incoming line signal, the receiver section requires some minimum signal-to-noise ratio (SNR) between the incoming signal and the "noise" corrupting that signal. One of the components of that "noise" is the aforementioned noise floor. As the frequency with which the digital circuitry operates increases, the noise floor increases, i.e., becomes worse, all other things being equal, principally as a result of the effect that higher-frequency switching has on noise component(c) mentioned above. Indeed, the noise floor could increase to a point that the SNR requirement of the receiver is no longer met and accurate data recovery is not possible. The noise floor thus becomes an increasingly important issue as a duplex wideband network termination embodying the principles of the invention is designed for use at higher and higher bit rates.

This tendency of the noise floor to increase with higher operational frequencies within the digital circuitry can be countered to some extent by careful circuit design and layout. At some point, however, further significant reduction in the noise floor will require a reduction in the amount of circuitry and/or integrated circuit area used to implement the network termination because such a reduction results in a reduced current demand which, it turns out, reduces the power-supply-induced noise and common-ground-induced noise. Indeed, given current technology, it appears that unless the circuitry implementing the receiver section can be reduced to a very few number of integrated circuit chips, it may not be possible to achieve an adequately low noise floor, particularly for 1.544 Mb/s operation.

A significant step toward the realization of this goal has been made by one of the present applicants, S. K. Rao, who has devised a multiplier circuit which requires significantly less integrated circuit area than multiplier circuits known heretofore—as much as 20 percent less. This is significant for at least two reasons. Firstly, multipliers are complex to begin with, so that 20 percent of same represents a significant saving of integrated circuit area. In addition, implementation of echo cancellers and equalizers operating at data rates such as 480 kb/s and above requires that the various multiplications performed therein be carried out in parallel using as many as sixteen concurrently operating multiplier circuits in the receiver section. Taking both of these factors into account, it will be appreciated that being able to reduce the size of a multiplier circuit by, say, 20 percent thus translates into a very large reduction in the overall integrated circuit area requirements of the receiver section and thus may be a significant factor in reducing the noise floor to an adequately low level.

This multiplier structure will now be described, beginning first with a discussion of its theoretical underpinnings:

Binary numbers are typically multiplied very much like decimal numbers. Specifically, each digit of each word is multiplied by each digit of the other word and the resulting partial products are then added, taking place significance into account. Thus two 8-bit binary numbers $a_0 a_1 a_2 a_3 a_4 a_5 a_6 a_7$ and $b_0 b_1 b_2 b_3 b_4 b_5 b_6 b_7$ can be multiplied as follows:

$$\begin{array}{r}
a_0 \; a_1 \; a_2 \; a_3 \; a_4 \; a_5 \; a_6 \; a_7 \\
b_0 \; b_1 \; b_2 \; b_3 \; b_4 \; b_5 \; b_6 \; b_7 \\
\hline
h_0 \; h_1 \; h_2 \; h_3 \; h_4 \; h_5 \; h_6 \; h_7 \\
i_0 \; i_1 \; i_2 \; i_3 \; i_4 \; i_5 \; i_6 \; i_7 \quad \leftarrow \text{partial products} \\
j_0 \; j_1 \; j_2 \; j_3 \; j_4 \; j_5 \; j_6 \; j_7 \\
\hline
o_0 \; o_1 \; o_2 \; o_3 \; o_4 \; o_5 \; o_6 \; o_7 \\
\text{[sum of the partial products]}
\end{array} \quad (1)$$

where each of the terms in the eight partial products is the product of a particular one of the a's with a particular one of the b's. Thus, for example, $h_7 = a_7 \cdot b_7$, $j_6 = b_4 \cdot a_6$, etc.

In actuality, no actual multiplications need to be performed because since the b's are all either "0" or "1", each one of the partial products $h_0 h_1 h_2 h_3 h_4 h_5 h_6 h_7$, $i_0 i_1 i_2 i_3 i_4 i_5 i_6 i_7$, etc., is either equal to 00000000 or $a_0 a_1 a_2 a_3 a_4 a_5 a_6 a_7$.

In order to reduce the number of multiplications and additions needed to multiply two binary numbers, we can re-write the multiplier using so-called modified Booth encoding wherein the binary number $b_0 b_1 \ldots b_7$, assumed to be in two's complement notation, can be expressed as a number $c_0 \; c_1 \; c_2 \; c_3$ where $$c_j = -2b_{j-1} + b_j + b_{j+1}$$

and where it can be shown that $$c_j = 0, \pm 1, \text{ or } \pm 2.$$

Thus, the above multiplication problem (1) can be rewritten as $$a_0\ a_1\ a_2\ a_3\ a_4\ a_5\ a_6\ a_7 \quad (2)$$
$$c_0\quad c_1\quad c_2\quad c_3$$

$$\begin{array}{l} p_0\ p_1\ p_2\ p_3\ p_4\ p_5\ p_6\ p_7\ p_8 \\ q_0\ q_1\ q_2\ q_3\ q_4\ q_5\ q_6\ q_7\ q_8 \\ r_0\ r_1\ r_2\ r_3\ r_4\ r_5\ r_6\ r_7\ r_8 \\ s_0\ s_1\ s_2\ s_3\ s_4\ s_5\ s_6\ s_7\ s_8 \end{array} \Longleftarrow \text{partial products}$$

[sum of the partial products]

from which it is apparent that many fewer additions are performed. Moreover, since $$c_j = 0, \pm 1, \text{ or } \pm 2,$$

the multiplication of the a's by the c's in (2) involves processing that is no more complicated than shifting and sign inverting. From an implementational standpoint, the use of modified Booth encoding is significant because the reduced number of additions translates directly into a reduced number of circuit elements needed, for example, to build a multiplier circuit on an integrated circuit chip. On the other hand, the way in which the partial products are added in accordance with conventional practice significantly dulls this advantage because of the need to do so-called sign-bit extension.

Specifically, consider the case where the binary numbers are written in two's complement notation, which is often the preferred way of representing them. In two's complement notation, the left-most bit represents the same magnitude as in a standard positive binary number, but it has a negative significance. Thus, for example, the number 1011 in two's complement notation is equal to decimal-5 because $$(-8)(1) + (4)(0) + (2)(1) + (1)(1) = -5$$

This characteristic of two's complement numbers must be taken into account in the course of adding the partial products when multiplying numbers in that form, because the terms in each column must all have the same significance sign-wise in order for them to be added.

Advantageously, this is an easy problem to solve from a mathematical standpoint because one of the properties of two's complement notation is that the left-most bit can be replicated, or "extended", to the left any desired number of times without changing the value of the number itself. Thus going further in the example above, we can rewrite (2) as:

$$a_0\ a_1\ a_2\ a_3\ a_4\ a_5\ a_6\ a_7 \quad (3)$$
$$c_0\quad c_1\quad c_2\quad c_3$$

$$\begin{array}{l} p_0\ p_0\ p_0\ p_0\ p_0\ p_0\ p_0\ p_1\ p_2\ p_3\ p_4\ p_5\ p_6\ p_7\ p_8 \\ q_0\ q_0\ q_0\ q_0\ q_0\ q_1\ q_2\ q_3\ q_4\ q_5\ q_6\ q_7\ q_8 \\ r_0\ r_0\ r_0\ r_1\ r_2\ r_3\ r_4\ r_5\ r_6\ r_7\ r_8 \\ s_0\ s_1\ s_2\ s_3\ s_4\ s_5\ s_6\ s_7\ s_8 \end{array} \Longleftarrow \text{partial products}$$

[sum of the partial products]

and then add directly in columns to achieve the final product. Disadvantageously, however, carrying out this sign-bit extension requires a significant amount of circuitry.

In accordance with the technique devised by S. K. Rao, however, the need to do sign-bit extension is avoided. In particular, the value represented by the sign bits of all the partial products is represented as a two's complement number in its own right. The bits of that number—referred to herein as the "sign-bit-value" word—rather than the original sign bits, are then used in the partial product addition. Since (as with all two's complement numbers) all the bits of the sign-bit-value word are guaranteed to have positive significance (except for the left-most one), the digits of the partial products can then be directly added without the need for sign bit extension.

Turning, then, to the example presented in (2), the magnitude of the value of the sign bits $p_0, q_0, r_0$ and $s_0$ can be represented by the positive-valued two's complement number $$0\ s_0\ 0\ r_0\ 0\ q_0\ 0\ p_0\ 0\ 0\ 0\ 0\ 0\ 0\ 0.$$

The actual value represented by those sign bits is, however, a negative number. In order to invert the sign of a two's complement number, we invert the binary value of each bit and then add "1" to the result, thusly:

$$\begin{array}{r} 1\ \bar{s}_0\ 1\ \bar{r}_0\ 1\ \bar{q}_0\ 1\ \bar{p}_0\ 1\ 1\ 1\ 1\ 1\ 1\ 1\ 1 \\ +0\ 0\ 0\ 0\ 0\ 0\ 0\ 0\ 0\ 0\ 0\ 0\ 0\ 0\ 0\ 1 \\ \hline 1\ \bar{s}_0\ 1\ \bar{r}_0\ 1\ \bar{q}_0\ 1\ (\bar{p}_0 + 1)\ 0\ 0\ 0\ 0\ 0\ 0\ 0\ 0 \end{array}$$

The multiplication in (2) can thus be rewritten as $$a_0\ a_1\ a_2\ a_3\ a_4\ a_5\ a_6\ a_7 \quad (4)$$
$$c_0\quad c_1\quad c_2\quad c_3$$

$$\begin{array}{l} \phantom{1\ \bar{s}_0\ 1\ \bar{r}_0\ 1\ \bar{q}_0\ } 1\ (\bar{p}_0 + 1)\ p_1\ p_2\ p_3\ p_4\ p_5\ p_6\ p_7\ p_8 \\ \phantom{1\ \bar{s}_0\ 1\ \bar{r}_0\ } 1\ \bar{q}_0\ q_1\ \phantom{q}\ q_2\ \phantom{q}\ q_3\ q_4\ q_5\ q_6\ q_7\ q_8 \\ \phantom{1\ \bar{s}_0\ } 1\ \bar{r}_0\ r_1\ r_2\ r_3\ \phantom{r}\ r_4\ \phantom{r}\ r_5\ r_6\ r_7\ r_8 \\ 1\ \bar{s}_0\ s_1\ s_2\ s_3\ s_4\ s_5\ \phantom{s}\ s_6\ \phantom{s}\ s_7\ s_8 \end{array} \Longleftarrow \text{partial products}$$

[sum of the partial products]

where, again, all of the digits except for the left-most "1" in the last partial product have positive significance and can thus simply be added. The need for sign-bit extension is thus avoided and the multiplier can be implemented with fewer circuit elements than in prior art arrangements.

Figure 11:
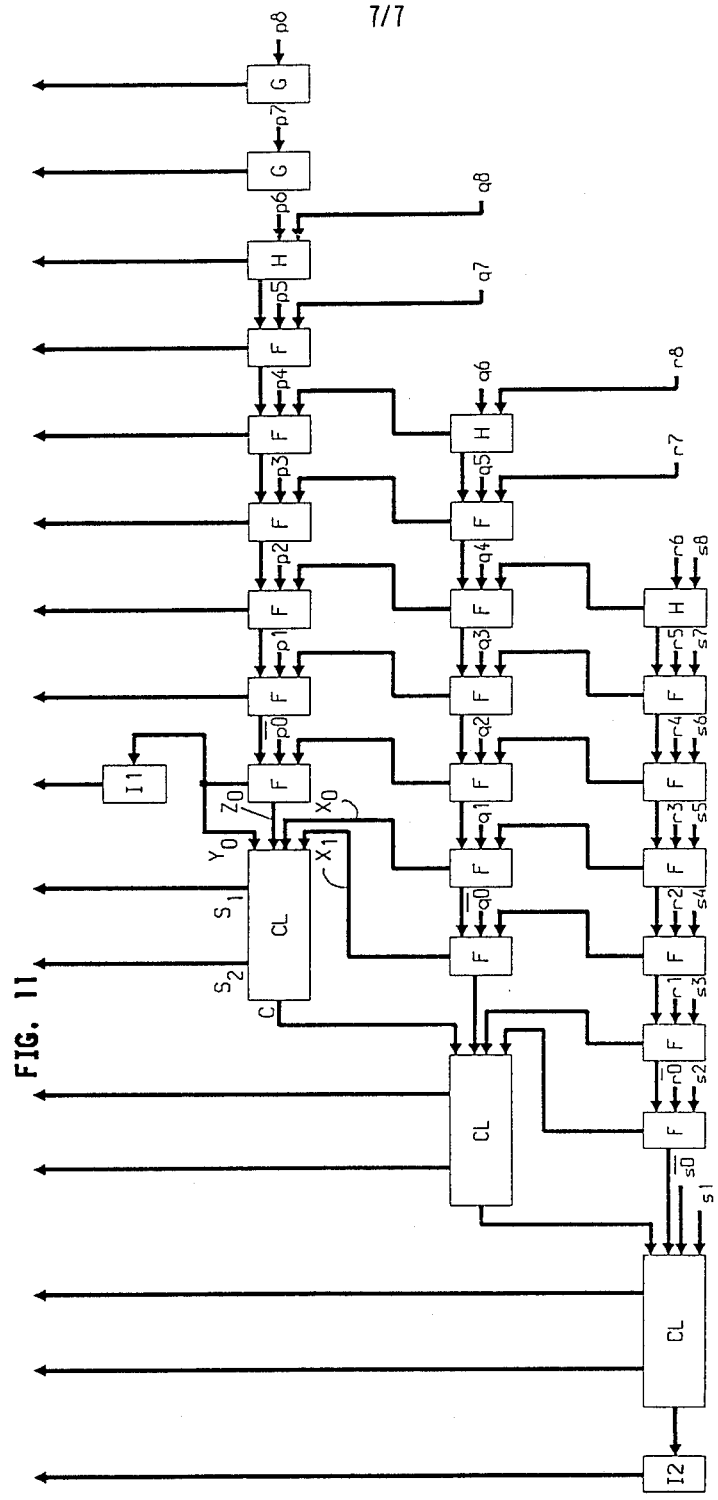
FIG. 11 is a portion of a multiplier circuit that can be advantageously used in integrated circuit realizations of the duplex wideband network termination of FIG. 7.

The arrangement and alignment of the digits in the partial products in (4) translates quite directly into a circuit realization for a multiplier circuit. FIG. 11 shows that part of such a multiplier circuit that adds together the partial products of (4). (The circuitry needed to convert the b's of (1) into modified Booth form—i.e., into the c's of (4)—and then to generate the partial products is well-known and straightforward and, therefore, is not shown in the FIG.) The various outputs across the top of FIG. 11 are the bits of the final product.

Specifically, each box marked "G" in FIG. 11 is a simple gate which takes its single input and provides it at its output. Each box marked "H" is a half adder which receives two inputs—specifically, two particular partial sum digits—and outputs a "sum" bit and a "carry" bit depicted as emerging from the top and left side of the box, respectively. Each box marked "F" is a full adder which receives three inputs—two particular partial sum digits and a carry bit from a lower-order adder stage. As with the half adders, each full adder outputs a "sum" bit and a "carry" bit. The box labelled "I1" is an inverter which, by virtue of inverting the output of the full adder that receives $p_0$, causes a "1" to be added thereto—that "1", it will be remembered, having arisen out of the sign-inversion procedure mentioned earlier. The carry bit resulting from this addition of "1" has the same value as the inverter input.

The three boxes labelled "CL" are identical carry look-ahead circuits each of which receives four explicit inputs. As shown for one of the carry look-ahead circuits, the four explicit inputs thereof are denoted $y_0$, $z_0$, $x_0$ and $x_1$, with $x_1$ having double the significance of the other inputs (reading from top to bottom). Each carry look-ahead circuit also has an implicit fifth input of value "1", this being the left-mos "1" of one of the partial products in (4). That "1" is not explicitly input into the carry look-ahead circuit nor is it explicitly added with the other inputs. Rather, the fact that a "1" is to be added to the other inputs is factored into the Boolean expressions which define the values of the two sum bits, $S_1$ and $S_2$, and the carry bit C that is output by each look-ahead circuit. In a sense, then, this "1" is added with the other inputs "automatically". Specifically, the aforementioned Boolean expressions are:

$$S_1 = x_0 \oplus y_0 \oplus z_0$$

$$S_2 = (x_0 + y_0 + z_0) \oplus x_1 \oplus x_0 y_0 z_0$$

$$C = [x_0 + z_0]x_1 + y_0[x_0 z_0 + x_1]$$

where "+" denotes logical OR and "$\oplus$" denotes logical exclusive-OR. In general, the top-most input $y_0$ will be the last of the four inputs to arrive because of processing required to generate it—particularly when $y_0$ is generated by a prior look-ahead circuit. Looking at the above relation for the carry bit C, however, it will be appreciated that most of the logical operations needed to generate carry bit C—such as the ORing of $x_0$ and $z_0$—can be performed without waiting for $y_0$. When the latter finally does arrive, then, there is little extra computation to be performed and thus the delay through the circuit as a whole is minimized.

A further advantageous feature of the circuitry shown in FIG. 11 is the fact that the digits of the partial products are added from the "bottom up". This is advantageous because the value of one of the carry look-ahead inputs—the "1" added implicitly within the carry look-ahead circuit—is known a priori, which means that the carry look-ahead circuits can be implemented with less circuitry than would be the case if none of the five inputs was known. Indeed, if, by contrast, the digits of the partial products were added from the "top down", so that these "1"s would have been added at an earlier stage of the processing, the carry look-ahead circuits would, it turns out, still have to have five inputs, but the values of those five inputs would all be unknown and the carry look-ahead circuitry would be more complex.

The carry output bit of the highest-order carry look-ahead circuit is applied to a second inverter, labelled "I2", in order to generate the highest-order bit of the output product. Inversion of that bit has the effect of adding "1" to it, that "1" being the left-most partial-product bit in (4).

The foregoing merely illustrates the principles of the invention and those skilled in the art will be able to devise numerous arrangements which, although not explicitly shown or described herein, embody the principles of the invention. By way of example, but not limitation, some possible variations and alternatives will now be described.

For example, the invention has been disclosed in the context of a circuit-oriented ISDN environment. However, it can also be used to provide high-speed data transmission in totally packetized non-ISDN environments, as well. It is, in addition, usable for use not only in telephone local loop transmission, but other suitable environments. Thus, for example, a DWNT embodying the principles of the invention could be used to interconnect—over a telephone local loop or other transmission loop—a local area network and a wide area network; a telephone central office and a local area network; a PBX and a central office, two PBXs, etc. In addition, in particular applications it may be advantageous to implement the DWNT in a "data over voice" mode in which the spectrum of the DWNT line signal is positioned so as to leave room at the lower end of the frequency spectrum for the insertion of an accompanying voice signal.

The invention has been disclosed using carrierless AM/PM. However, other passband transmission schemes, including non-carrierless schemes such as quadrature-amplitude modulation, can be used to implement the invention. Similarly, although the illustrative embodiment utilizes a two-dimensional modulation scheme, the invention can be implemented using modulation schemes of any other desired dimensionality, including, for example, one-, four- or eight-dimensions. Advantageously, a multi-dimensional modulated signal may be more robust in the presence of particular channel impairments than, say, a one-dimensional, e.g., single sideband, modulated signal. In addition, as long as the coordinates of the symbol in each dimension are dependent—that is, each coordinate is a function of all of the data bits that the symbol represents, rather than being an independent function of some subset of those bits—increasing the dimensionality of the symbols increases the margin against noise and various channel impairments. Indeed, the improved receiver error performance may be sufficiently significant to make worthwhile the added implementational complexity of using, say, four or eight dimensions. It is important to note in this context, however, that any gains achieved by going to, say, four or eight dimensions may be of little value unless the receiver—and particularly its equalizer—is carefully designed to minimize its required input signal-to-noise ratio.

The invention has been illustrated in the context of a network termination which operates at at least 480 kb/s. However, it could be used at lower bit rates, e.g., 160 kb/s, if this were found to be desirable.

A particular circuit configuration for DWNT 32 is shown in the illustrative embodiment. Here, too, however, many variations are possible. For example, the arrangement shown in FIG. 7 implements a so-called Nyquist, or "interpolating," echo canceller wherein the incoming line signal is sampled at at least twice the highest frequency present in that signal, and the echo replica samples, generated at that same rate, are subtracted prior to equalization. An alternative approach, however, is to generate the echo replica samples at the symbol rate and subtract them after equalization. There are advantages and disadvantages to each approach. For example, the cost of an A/D converter generally increases as the required speed of operation increases and, indeed, a Nyquist rate A/D converter for a DWNT operating at 1.544 Mb/s could be quite expensive. In such applications, then, symbol rate post-equalization echo cancellation might be preferred. A further advantage of symbol rate echo cancellation is that the echo canceller itself requires significantly less circuitry, thereby reducing the overall DWNT cost. On the other hand, symbol rate echo cancellation requires that there be synchronization between the transmitter and receiver clocks within the DWNT. This can give rise to timing jitter in the symbols supplied to the echo canceller which, in turn, can significantly degrade echo canceller performance.

All in all, we believe that Nyquist rate echo cancellation, such as shown in FIG. 7, is probably the technically superior approach for a DWNT. From a commercial standpoint, however, symbol rate echo cancellation may be the preferred approach, particularly at 1.544 Mb/s, until the cost of very high speed A/D converters comes down.

Other alternative configurations for DWNT 32 relate to the method of equalization used. Equalizer 750 is a so-called feedforward, or linear, equalizer which compensates for linear distortion in the channel via an adaptive filtering of line signal samples in order to provide a relatively distortion-free digital replication of the transmitted line signal. There is, however, an alternative form of equalization, usually referred to as decision feedback equalization, or DFE. This approach combines the use of some linear equalization—needed to equalize the so-called precursors in the line signal—with an adaptive filtering of priorly formed data decisions—used to equalize the so-called post-cursors. As a general proposition, equalization enhances noise present in the signal being equalized, but the noise enhancement attendant to DFE can be significantly less than when linear equalization is used exclusively. It should be pointed out, however, that in implementing a decision feedback equalizer in a DWNT which employs trellis coding, the aforementioned delay introduced by the Viterbi decoder in providing its output decisions should be taken into account.

The illustrative embodiment discloses the invention in the context of transmission over a two-wire loop. An alternative, however, is to use a four-wire loop, i.e., a separate two-wire loop for each direction of transmission, in which case, of course, no echo cancellation would be needed.

Finally, the invention is disclosed herein in a form in which the various signal processing functions are performed by discrete functional blocks. However, any one or more of these functions could equally well be performed by one or more appropriately programmed microprocessors, microcoded digital signal processing chips, etc.

What is claimed is:

1. A data communication method comprising the steps of
    generating an outbound passband signal representing a stream of outbound data bits,
    applying said outbound passband signal to a two-wire telephone local loop,
    receiving over said telephone local loop an inbound passband signal representing a stream of inbound data bits, said inbound passband signal including echoes of said outbound passband signal,
    generating a replica of said echoes,
    substracting said replica from said inbound passband signal to generate an echo compensated signal, and
    recovering said inbound data bits from said echo-compensated signal,
    at least one of said inbound or outbound bit streams being at a rate of at least 160 kb/s.

2. The method of claim 1 wherein at least one of said bit streams is at a rate of at least 480 kb/s.

3. The method of claim 1 wherein at least one of said bit streams is at a rate of at least 1.544 Mb/s.

4. The method of claim 1 wherein said outbound passband signal is a carrierless amplitude-and-phase modulated signal.

5. The method of claim 1 wherein said outbound passband signal is a signal representing a stream of channel symbols selected from a predetermined signal constellation, said channel symbols being selected as a function of a trellis coded version of said stream of outbound data bits.

6. The method of claim 1 wherein said inbound passband signal represents said inbound data in a stream of channel symbols selected from a predetermined signal constellation, said channel symbols being selected as a function of a trellis coded version of said stream of inbound data bits, and wherein said recovering step includes the steps of
    adaptively equalizing said inbound passband signal,
    recovering said stream of channel symbols by Viterbi decoding the resulting equalized signal, and
    recovering said inbound data bits from the recovered channel symbols.

7. A data communication method comprising the steps of
    generating an outbound passband signal representing a stream of channel symbols selected from a predetermined signal constellation, said channel symbols being selected as a function of a stream of outbound data bits,
    applying said outbound passband signal to a two-wire telephone local loop,
    receiving an inbound passband signal representing a stream of inbound channel symbols selected from said predetermined signal constellation, said channel symbols having been selected as a function of a stream of inbound data bits, said inbound passband signal including echoes of said outbound passband signal,
    generating an adaptively equalized version of said inbound passband signal from which a replica of said echoes has been subtracted,
    recovering said stream of inbound channel symbols from the resulting equalized signal, and
    recovering said inbound data bits from the recovered inbound channel symbols,
    at least one of said inbound or outbound streams of data bits being at a rate of at least 160 kb/s.

8. The method of claim 7 wherein each of said outbound and inbound passband signals is a carrierless amplitude-and-phase modulated signal.

9. The method of claim 7 wherein at least one of said bit streams is at a rate of at least 480 kb/s.

10. The method of claim 7 wherein at least one of said bit streams is at a rate of at least 1.544 Mb/s.

11. A data communication method comprising the steps of
    generating an outbound passband signal representing a stream of channel symbols selected from a predetermined signal constellation, said channel symbols being selected as a function of a trellis coded version of a stream of outbound data bits,
    applying said outbound passband signal to a two-wire telephone local loop,
    receiving an inbound passband signal representing a stream of inbound channel symbols selected from said predetermined signal constellation, said channel symbols having been selected as a function of a trellis coded version of a stream of inbound data bits, said inbound passband signal including echoes of said outbound passband signal, generating an adaptively equalized version of said inbound passband signal from which a replica of said echoes has been subtracted, recovering said stream of inbound channel symbols by Viterbi decoding the resulting equalized signal, and recovering said inbound data bits from the recovered inbound channel symbols, at least one of said inbound or outbound streams of data bits being at a rate of at least 160 kb/s.

12. The method of claim 11 wherein each of said outbound and inbound passband signals is a carrierless amplitude-and-phase modulated signal.

13. The method of claim 11 wherein at least one of said bit streams is at a rate of at least 480 kb/s.

14. The method of claim 11 wherein at least one of said bit streams is at a rate of at least 1.544 Mb/s.

15. A network termination comprising transmitter means operative in response to receipt of a stream of outbound data bits for generating an outbound passband signal representing said outbound data bits, means for applying said outbound passband signal to a two-wire telephone local loop, and receiver means operative in response to an inbound passband signal which represents a stream of inbound data bits and which includes echoes of said outbound passband signal for recovering said inbound data bits from said inbound passband signal, said inbound passband signal having been received over a signal path which includes said two-wire telephone local loop, said receiver means including echo canceller means for generating a replica of said echoes and means for subtracting said replica from said inbound passband signal prior to the recovery of said inbound data bits therefrom, at least one of said inbound or outbound bit streams being at a rate of at least 160 kb/s.

16. The invention of claim 15 wherein at least one of said bit streams is at a rate of at least 480 kb/s.

17. The invention of claim 15 wherein at least one of said bit streams is at a rate of at least 1.544 Mb/s.

18. The invention of claim 15 wherein said transmitter means includes means for generating as said outbound passband signal a carrierless amplitude-and-phase modulated signal.

19. The invention of claim 15 wherein said transmitter means generates as said outbound passband signal a signal representing a stream of channel symbols selected from a predetermined signal constellation, said channel symbols being selected as a function of a trellis coded version of said stream of outbound data bits.

20. The invention of claim 15 wherein said inbound passband signal represents said inbound data in a stream of channel symbols selected from a predetermined signal constellation, said channel symbols being selected as a function of a trellis coded version of said stream of inbound data bits, and wherein said receiver means includes means for adaptively equalizing said inbound passband signal, means for recovering said stream of channel symbols by Viterbi decoding the resulting equalized signal, and means for recovering said inbound data bits from the recovered channel symbols.

21. In combination, a two-wire telephone local loop, transmitter means for generating an outbound passband signal representing a stream of channel symbols selected from a predetermined signal constellation, said channel symbols being selected as a function of a stream of outbound data bits, means for applying said outbound passband signal to said two-wire telephone local loop, means for receiving an inbound passband signal representing a stream of inbound channel symbols selected from said predetermined signal constellation, said channel symbols having been selected as a function of a stream of inbound data bits, said inbound passband signal including echoes of said outbound passband signal, means for generating an adaptively equalized version of said inbound passband signal from which a replica of said echoes has been subtracted, means for recovering said stream of inbound channel symbols from the resulting equalized signal, and means for recovering said inbound data bits from the recovered inbound channel symbols, at least one of said inbound or outbound streams of data bits being at a rate of at least 160 kb/s.

22. The invention of claim 21 wherein each of said outbound and inbound passband signals is a carrierless amplitude-and-phase modulated signal.

23. The invention of claim 21 wherein at least one of said bit streams is at a rate of at least 480 kb/s.

24. The invention of claim 21 wherein at least one of said bit streams is at a rate of at least 1.544 Mb/s.

25. A network termination comprising transmitter means for generating an outbound passband signal representing a stream of channel symbols selected from a predetermined signal constellation, said channel symbols being selected as a function of a trellis coded version of a stream of outbound data bits, means for applying said outbound passband signal to a two-wire telephone local loop, means for receiving an inbound passband signal representing a stream of inbound channel symbols selected from said predetermined signal constellation, said channel symbols having been selected as a function of a trellis coded version of a stream of inbound data bits, said inbound passband signal including echoes of said outbound passband signal, means for generating an adaptively equalized version of said inbound passband signal from which a replica of said echoes has been subtracted, means for recovering said stream of inbound channel symbols by Viterbi decoding the resulting equalized signal, and means for recovering said inbound data bits from the recovered inbound channel symbols, at least one of said inbound or outbound streams of data bits being at a rate of at least 160 kb/s.

26. The invention of claim 25 wherein each of said outbound and inbound passband signals is a carrierless amplitude-and-phase modulated signal.

27. The invention of claim 25 wherein at least one of said bit streams is at a rate of at least 480 kb/s.

28. The invention of claim 25 wherein at least one of said bit streams is at a rate of at least 1.544 Mb/s.

* * * * *